US012711147B2

(12) United States Patent
Nainani et al.

(10) Patent No.: US 12,711,147 B2
(45) Date of Patent: Aug. 18, 2026

(54) ARTIFICIAL INTELLIGENCE ENHANCED DUE DILIGENCE

(71) Applicant: Palantir Technologies Inc., Denver, CO (US)

(72) Inventors: Nikhil Nainani, Zurich (CH); Rachel Woolley, Malahide (IE); Sebastian Heuser, Zurich (CH)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 19/049,897

(22) Filed: Feb. 10, 2025

(65) Prior Publication Data

US 2026/0147779 A1 May 28, 2026

Related U.S. Application Data

(60) Provisional application No. 63/723,900, filed on Nov. 22, 2024.

(51) Int. Cl.

*G06F 16/00* (2019.01)
*G06F 16/25* (2019.01)
*G06F 40/30* (2020.01)
*G06Q 10/0635* (2023.01)

(52) U.S. Cl.

CPC ............ *G06F 16/258* (2019.01); *G06F 40/30* (2020.01); *G06Q 10/0635* (2013.01)

(58) Field of Classification Search

None

See application file for complete search history.

(56) References Cited

U.S. PATENT DOCUMENTS

| | | | | |
|---|---|---|---|---|
| 12,211,598 | B1 * | 1/2025 | Aravamudan | G16H 10/60 |
| 12,406,084 | B1 * | 9/2025 | Krull | G06F 9/547 |
| 2002/0032635 | A1 | 3/2002 | Harris et al. | |
| 2004/0024692 | A1 | 2/2004 | Turbeville et al. | |
| 2007/0255647 | A1 | 11/2007 | Eicher et al. | |
| 2007/0294119 | A1 | 12/2007 | Eicher et al. | |
| 2024/0362278 | A1 * | 10/2024 | PerezLeon | G06F 40/40 |
| 2024/0370479 | A1 * | 11/2024 | Hudetz | G06F 16/316 |
| 2025/0013635 | A1 * | 1/2025 | Shah | G06F 16/24522 |
| 2025/0111335 | A1 * | 4/2025 | Wilson | G06Q 10/103 |
| 2025/0111380 | A1 * | 4/2025 | Wilson | G06Q 30/016 |
| 2025/0200034 | A1 * | 6/2025 | Raviv | G06Q 30/0242 |
| 2025/0272652 | A1 * | 8/2025 | Makhija | G06Q 10/087 |

FOREIGN PATENT DOCUMENTS

WO WO 2016/138183 9/2016

* cited by examiner

*Primary Examiner* — Farhan M Syed

(74) *Attorney, Agent, or Firm* — Knobbe, Martens, Olson & Bear, LLP

(57) ABSTRACT

An enhanced due diligence system leverages artificial intelligence to streamline and improve the accuracy of risk assessments for counterparties. The system integrates modules for data extraction, compliance screening, media analysis, and risk evaluation, utilizing large language models and natural language processing to convert unstructured data into structured insights. The system is capable of performing periodic assessments across all entities in a database or on-demand for individual entities, ensuring up-to-date risk assessments. The user interface allows for interaction with the assessment results, providing a comprehensive overview of risk indicators. The system stores risk assessment information providing auditability of prior results.

19 Claims, 9 Drawing Sheets

ARTIFICIAL INTELLIGENCE ENHANCED DUE DILIGENCE

CROSS-REFERENCE TO RELATED APPLICATIONS

This application claims benefit of U.S. Provisional Patent Application No. 63/723,900, filed Nov. 22, 2024, and titled "ARTIFICIAL INTELLIGENCE ENHANCED DUE DILIGENCE." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

FIELD

Implementations of the present disclosure relate to systems and techniques for improving user interactions with computer-based models. More specifically, implementations of the present disclosure relate to computerized systems and techniques that improve user interactions with artificial intelligence systems, such as large language models ("LLMs"), natural language processing ("NLP"), and other artificial intelligence systems.

BACKGROUND

Due diligence of counterparties is an elaborate process.

SUMMARY

The systems, methods, and devices described herein each have several aspects, no single one of which is solely responsible for its desirable attributes. Without limiting the scope of this disclosure, several non-limiting features will now be described briefly.

An enhanced due diligence system performs complex due diligence tasks that cannot be accomplished using traditional methods such as pen and paper or within a human mind. The system may include a data ingestion, entity resolution, compliance screening, media screening, and risk assessment processes that rely on large amounts of data, complex algorithms, and advanced AI models. The system enables organizations to make informed decisions about potential counterparties quickly and efficiently, while minimizing the risks associated with individual counterparties. Additionally, by employing machine learning techniques such as self-supervised learning and LLMs, the system can continuously learn and improve its accuracy over time, making it more effective at identifying high-risk entities and assessing risks across multiple categories. In this way, the system provides a powerful tool for organizations to conduct thorough due diligence on potential counterparties while minimizing the need for manual intervention and human error.

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 3 is an example user interface showing an overview of counterparties that the due diligence process described above has been performed on.

DETAILED DESCRIPTION

Figure 1:
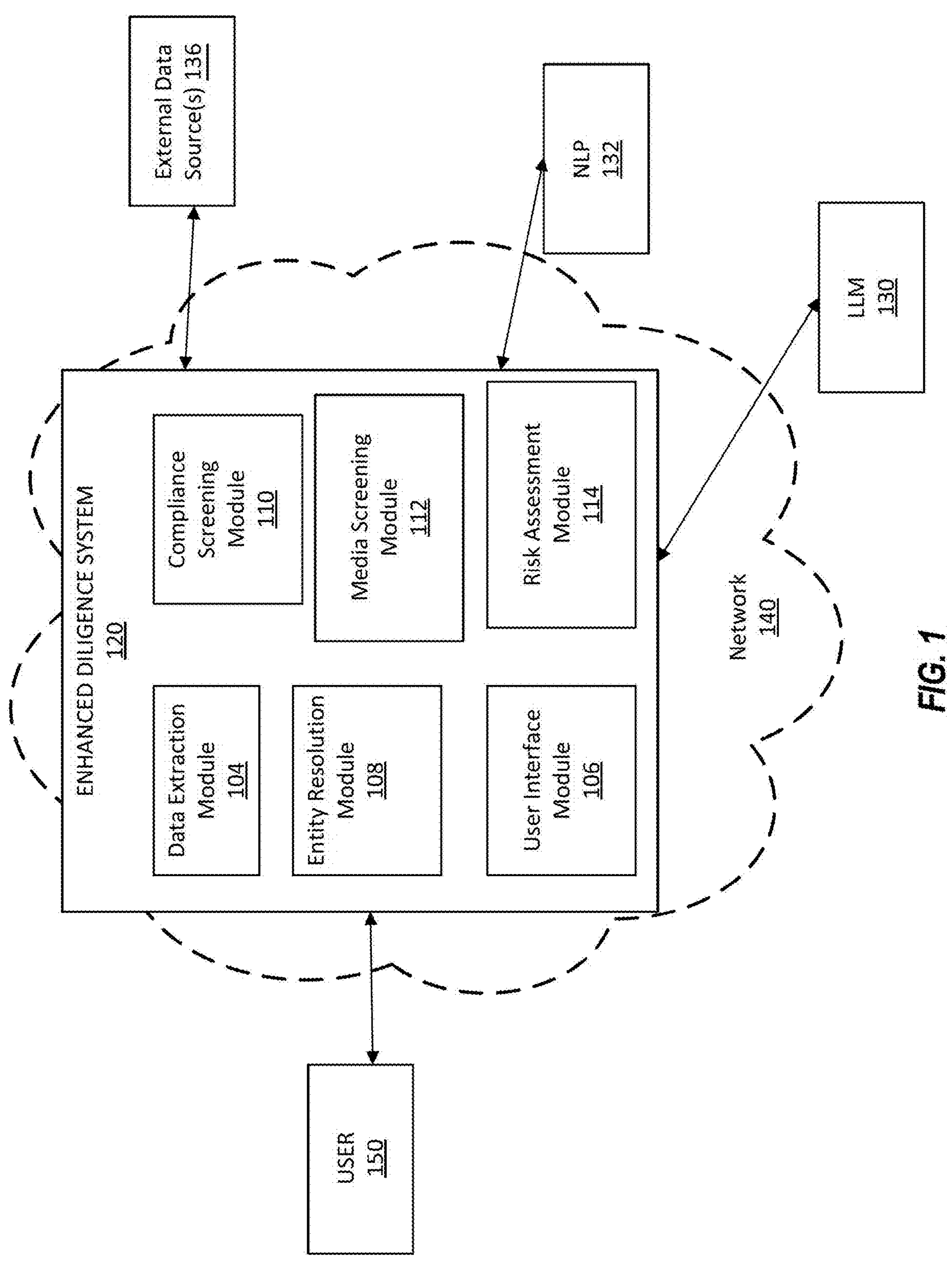
FIG. 1 is a block diagram illustrating an example enhanced due diligence system in communication with various computing devices.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

An enhanced due diligence system performs complex due diligence tasks that cannot be accomplished using traditional methods such as pen and paper or within a human mind. The system may include a data ingestion, entity resolution, compliance screening, media screening, and risk assessment processes that rely on large amounts of data, complex algorithms, and advanced AI models. The system enables organizations to make informed decisions about potential counterparties quickly and efficiently, while minimizing the risks associated with individual counterparties. Additionally, by employing machine learning techniques such as self-supervised learning and LLMs, the system can continuously learn and improve its accuracy over time, making it more effective at identifying high-risk entities and assessing risks across multiple categories. In this way, the system provides a powerful tool for organizations to conduct thorough due diligence on potential counterparties while minimizing the need for manual intervention and human error.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LlaMA (Large Language Model Meta AI), and BigScience Large Open-science Open-access Multilingual Language Model (BLOOM).

A Natural Language Processor (NLP) is a system that enables computers to understand, interpret, generate, and manipulate human language. A NLP may use various algorithms and statistical models that allow for the processing and analysis of textual data in a manner that mimics human understanding. These techniques may include tokenization, which involves breaking down text into smaller units called tokens; part-of-speech tagging, which assigns grammatical categories to each token, enhancing the syntactic understanding of sentences; and named entity recognition (NER), which identifies and classifies significant entities within text, such as names of people, organizations, and locations. Additionally, a NLP may perform sentiment analysis to ascertain the emotional tone expressed in a body of text, which may be useful in understanding user feedback. Language translation may be another capability of a NLP, enabling automatic conversion of text between different languages, while text summarization condenses longer texts into concise summaries, retaining key information. Furthermore, a NLP may facilitate question answering, allowing systems to provide relevant responses to user inquiries based on contextual understanding.

The term "agent," as used in the present disclosure, can refer to a software- and/or computer-based decision making entity that is designed to be specialized at solving a class of problems. The class of problems that a particular agent can solve can include simple (e.g., sending a single request to a large language model (LLM) service) or more complex ones (e.g., chaining a set of tools behind each other in a dynamic fashion to solve a complex problem). An agent can be defined by a combination of building blocks including: agent logic (e.g., a core programmatic definition on how this specific agent should interact with available tools, configurations, and users); tools (e.g., a defined set of tools available for the specific agent); guardrails (e.g., a core security mechanism to control the interaction of the agent with the system, such as permissions regarding ontology access); and/or agent storage (e.g., also referred to as agent memory, including a data store and/or memory space allowing an individual agent to keep track of relevant information (e.g., messages and accessories) during and across runs). An example of a specialized agent is an "evaluator agent." An evaluator agent is a software- and/or computer-based decision making entity (e.g., an agent) specialized at identifying and/or solving one or more problems associated with another agent and/or with the system. The specific combination of building blocks and/or configurations that define an evaluator agent can be referred to as an "evaluator agent configuration" as described herein.

The term "tool," as used in the present disclosure, can refer to a specific capability that is available to an agent. A tool may be responsible to perform a deterministic action and/or a tool may include the use of an LLM and perform nondeterministic actions. A tool may allow an agent to interact with a system, a database, an ontology, internal databases, and/or external systems (e.g., an LLM). A tool can be any set of logic or rules that can be provided to an agent for the agent's use to obtain additional information, such as by generating a request for access to additional data via a plug-in. Thus, a tool can be used by an agent to generate requests (that may be fulfilled by the system) to perform operations such as querying datasets, processing data including filtering or aggregating data, writing to datasets (e.g., adding or updating rows of a table, editing or updating an object type, updating parameter values for an object instance, generating a new object instance), implementing integrated applications (e.g., an email or SMS application), communicating with external application programming interfaces (APIs), communicating with one or more LLMs, and/or any other functions that communicate with other external or internal components. Example tools include ontology function tools that may access and/or retrieve data from a database, date/time tools that may generate and or transmit the data/time, query objects tools that may query one or more datasets for data objects, data object types, a subset of data objects based on one or more properties and/or the like, calculator tools for computational functions, and apply action tools to execute one or more actions associated with an ontology, a dataset, an evaluation metric, a system metric, and/or the like. Tools, or the set of logic they comprise for performing one or more operations, may be defined by the system, an external system, an ontology and/or a user. A subset of tools can include evaluation tools. Evaluation tools can include tools having specific capabilities to accomplish one or more evaluation tasks associated with evaluating an agent and/or a system. Evaluation tools can be deterministic and/or nondeterministic as described above. An evaluation tool can include evaluation tool configurations, enabling a user to define one or more aspects of an evaluation tool's capabilities.

A "user operation" (or "User Input") can be any operations performed by one or more users to user interface(s) and/or other user input devices associated with a system (e.g., the data extraction system). User operations can include, for example, select, drag, move, group, or the like. User operations (e.g., input a text data to the data extraction system) can also prompt a task to be performed, such as by an LLM, in whole or in part.

A Prompt (or "Natural Language Prompt") can be, for example, a term, phrase, question, and/or statement written in a natural and/or human language (e.g., English, Chinese, Spanish, and/or another language), and/or other text string, that may serve as a starting point for a language model and/or other language processing. A prompt may include text generated by user input(s), the system, one or more tools, the result of an agent, an external system, a response from an LLM, and/or the like. A prompt may be provided to an LLM which the LLM can use to generate a response.

An "Ontology" can include stored information that provides a data model for storage of data in one or more databases and/or other data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. An ontology may be used by an organization to model a view of, or provide a template for, what objects exist in the world, what their properties are, and how they are related to each other.

A Data Object (or "Object" or "Data Object Instance") is a data container for information representing a specific thing in the world that has a number of definable properties. For example, a data object can represent an interaction (e.g., recording events occurred during the interaction) between a user and an agent system. A data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (also referred to as "contents") may be represented in one or more properties. Attributes may include, for example, metadata about an object, such as a geographic location associated with the item, a value associated with the item, a probability associated with the item, an event associated with the item, and so forth. A data object may be of a data object type, where the data object is stored in a database that is associated with an ontology that defines the data object type.

A Data Object Type (or "Object Type") is a type of a data object (e.g., person, event, document, and/or the like). Data object types may be defined by an ontology and may be modified or updated to include additional object types. A data object definition (e.g., in an ontology) may include how the data object is related to other data objects, such as being a sub-data object type of another data object type (e.g., an agent may be a sub-data object type of a person data object type), and the properties the data object type may have.

A "data store" can be any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A "database" is any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, extensible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like.

Example Enhanced Due Diligence System

FIG. 1 is a block diagram illustrating an example enhanced due diligence system 120 (referred to herein as "system 120") in communication with various computing devices. In this example, the system 120 connects via network 140 to devices including a user 150, a large language model ("LLM") 130, a nature language processor ("NLP") 132, and external data sources 136. For example, the user 150 may transmit a request to the system 120 to provide a user interface associated with an enhanced due diligence process. The system 120 may communicate with the user 150 and perform an enhanced due diligence process via execution of the various modules 104-110 and communications with the LLM 130, NLP 132, and/or external data sources 136, as discussed further below.

User 150 may include user device(s) to view and/or interact with a GUI generated by the user interface module 106. For example, the user 150 can include a wide variety of computing devices, including personal computing devices, terminal computing devices, laptop computing devices, tablet computing devices, electronic reader devices, mobile devices (e.g., desktop computer, notebook computer, smartphone, or any other type of computing device) and associated software (e.g. a browser capable of rendering output from information provided by, for example, User interface module 106). The user may be an analyst that is performing due diligence on a counterparty entity, such as an individual or organization that the user (or user's employer) is considering for a transaction, e.g., personal, financial, business, etc. A counterparty may include, for example, a current or potential customer, vendor, or partner. The user may communicate with the system 120, such as to provide information regarding the counterparty, and receive one or more risk indicators associated with the counterparty from the system 120, as discussed in further detail below.

LLM 130 and NLP 132, as described above, can be internal (e.g., only accessible to an organization that controls the system 120) and/or external (e.g., accessible via the Internet, such as via API calls to an LLM endpoint) devices or systems. In various embodiments, various modules of the system 120 communicate with the LLM 130 and/or NLP 132 as part of an enhanced due diligence process.

External data source(s) 136 may include a third-party server and/or data store implemented as a computer system having logical elements. In an example implementation, the logical elements may include program instructions recorded on one or more machine-readable storage media. Alternatively, the logical elements may be implemented in hardware, firmware, or a combination thereof. The External data source(s) 136 may include various data sources with information relevant for an enhanced due diligence process such as, for example, Internet search engines, lists of entities or interest (e.g., high risk entities, entities with compliance, legal, financial, or other violations, and the like), and/or any other data sources.

The network 140 can include any one or more communications networks, such as the Internet. The network 140 may be any combination of local area network and/or a wireless area network or the like. Accordingly, various components of the computing environment of FIG. 1, including the system 120, can communicate with one another directly or indirectly via any appropriate communications links and/or networks, such as network 140 (e.g., one or more communications links, one or more computer networks, one or more wired or wireless connections, the Internet, any combination of the foregoing, and/or the like). Similarly, the various components (e.g., as described below) of the system 120 and the computing environment of FIG. 1 may, in various implementations, communicate with one another directly or indirectly via any appropriate communications links (e.g., one or more communications links, one or more computer networks, one or more wired or wireless connections, the Internet, any combination of the foregoing, and/or the like).

In this example, the system 120 includes multiple modules that perform various functions of an enhanced due diligence process. In other embodiments, the functions of these modules may be combined into fewer modules or separated among additional modules. Additionally, some or all of the functionality of the modules may be performed by another computing system in communication with the system 120, including cloud-based environments or virtual machines.

A user interface module 106 provides an interactive platform for user 150 to engage with the system. This module facilitates the input and review of data, allowing users to interact with the system's functionalities effectively. User interface module 106 may transmit, receive, and/or retrieve data from various components of the computing environment in FIG. 1. User interface module 106 may generate a GUI displayed on a client device, such as user 150. User interface module 106 may also receive data from the user 150, external data source(s) 136, NLP 132, and/or LLM 130.

A data extraction module 104 is configured to collect and analyze information from various sources, such as both structured and unstructured data formats. For example, structured data, such as PDFs or images of documents, may be analyzed via an LLM, natural language processing module, and/or other artificial intelligence processes to identify relevant data in the documents and convert to a structured format. For example, the structured format may be a table or spreadsheet of data, data objects, JSON, XML, and/or any other format of structured data.

The data extraction module 104 may receive one or more documents, such as Know Your Customer (KYC) forms, that contain information about a counterparty of interest. To address spelling mistakes and inconsistencies in names within the provided documentation, the data extraction module 104 may utilize an entity resolution module 108, which can communicate with the LLM 130, NLP 132, and/or other AI modules to identify common entities, even when they have slight variations or inconsistencies in their names. For example, using the LLM 130 allows for identification of different spellings of a person's name, nicknames, or abbreviations that might not be recognized by a deterministic entity resolution system. In addition, the entity resolution module 108, in conjunction with an LLM, may be aware of differences in languages and cultures that may impact entity resolution. For example, the entity resolution module 108 could use machine translation to convert text from one language to another, or cultural understanding algorithms to account for differences in naming conventions, business structures, and other factors that might affect the accuracy of the entity resolution process.

In some embodiments, the entity resolution module 108 is designed to identify related entities to the counterparty, such as corporate leadership or other key individuals who should be analyzed as part of the overall risk assessment. The entity resolution module 108 may also use various internal and/or external data sources, such as public databases, regulatory records, and commercial databases, to identify connections between the counterparty and other entities, such as affiliates or subsidiaries. Additionally, it can perform name disambiguation by using machine learning algorithms to determine whether multiple entities with similar names are actually referring to the same entity.

In some embodiments, the entity resolution module 108 may use various techniques to improve the accuracy and efficiency of the entity resolution process, such as using fuzzy matching algorithms to handle slight variations in names, or using machine learning models to identify patterns and make predictions about the entities being analyzed. U.S. patent application Ser. No. 17/683,986, filed on Mar. 1, 2022, and published as U.S. Pat. No. 11,720,580, titled "Entity Matching with Machine Learning Fuzzy Logic," which is hereby incorporated by reference in its entirety for all purposes, provides additional examples of entity resolution through use of fuzzy matching algorithms.

A compliance screening module 110 is configured to screen the counterparty based on comparison with names on one or more lists of entities associated with negative activities, such as high risk entities, entities with compliance, legal, financial, or other violations, and the like. The compliance screening module 110 can use various sources for these lists, including but not limited to watchlists, international sanctions lists, and industry-specific blacklists, that may be provided by external data sources 136.

A media screening module 112 is configured to search news articles, business journals, and other public (and/or private) sources for information relevant to the risk assessment. The media screening module can communicate with the NLP 132 to aid in understanding context of the information being analyzed, as well as sentiment analysis to determine the tone and sentiment of the sources being reviewed.

In some embodiments, the media screening module 112 breaks down the media screening task by focusing on specific aspects of the counterparty and related entities, including their industry, location, and any other relevant factors that may impact the level of risk associated with them. For example, the media screening module 112 may generate multiple discrete requests to the LLM 130 to improve level of attention given to specific aspects of the media screening process. These discrete tasks could be separated by entity (e.g., a separate LLM prompt for the original counterparty and each related entity), by media type (e.g., corruption, environmental, sanctions, etc.), by date range (e.g., within a certain time period), language, and/or other criteria.

For example, the LLM tasks could be separated by entity, allowing for a detailed analysis of the original counterparty entity as well as any related entities that may be connected to them. This can help to identify potential risks or issues that might not have been apparent from considering the counterparty and some or all related entities all-together. Separating LLM tasks based on media type, such as corruption, environmental, sanctions, and other relevant categories may allow for a more focused analysis of the specific types of information that are most likely to be relevant to the risk assessment. For example, if the counterparty is in the energy sector, it would make sense to focus on news articles or reports related to environmental regulation or compliance issues. Separating LLM tasks based on other criteria such as date range, language, and/or location may provide a more detailed and relevant analysis of data sources from a specific region or time period, providing insights into local market conditions or trends that might impact the level of risk associated with the counterparty.

By breaking down the media screening task in this way, the system can provide a more comprehensive and nuanced understanding of the risks associated with the counterparty, taking into account both the quantity and quality of negative findings. This helps to reduce false positives and improve the overall accuracy of the risk assessment process, making it easier for users to make informed decisions about the counterparties they are considering transacting with.

A risk assessment module 114 may access results from the entity resolution module 108, compliance screening module 110, media screening module 112, and/or other modules of system 120, take into account organization rules regarding acceptable levels of risk, and generate risk scores associated with each of multiple risk categories and/or an overall risk score. The risk assessment module 114 may employ various methods to weigh different factors and calculate an overall risk score, such as using statistical analysis or machine learning algorithms.

An overall risk score may reflect the level of risk associated with the counterparty based on all of the information gathered during the risk assessment process, taking into account any organization-specific rules regarding acceptable levels of risk. This allows organizations to quickly and easily compare different counterparties and make informed decisions about which ones are worth pursuing and which ones should be avoided, in accordance with their risk tolerance and business objectives.

The user interface module may also generate reports that include the risk scores for each of the multiple risk categories and/or an overall risk score, as well as other relevant information gathered during the enhanced due diligence process. The report may be generated in various formats, such as a PDF, Word document, or interactive online document, and may be customized to meet the specific needs of the user.

In some embodiments, the report generation module can also include an option for the user to specify certain criteria for generating the report, such as the level of detail, the format, and any specific data points that should be included in the report. The report generation module may also allow the user to export the report to various formats, such as a PDF or Word document, or send it directly to another person or department within the organization for further review and/or action.

Example Enhanced Due Diligence Process

Figure 2:
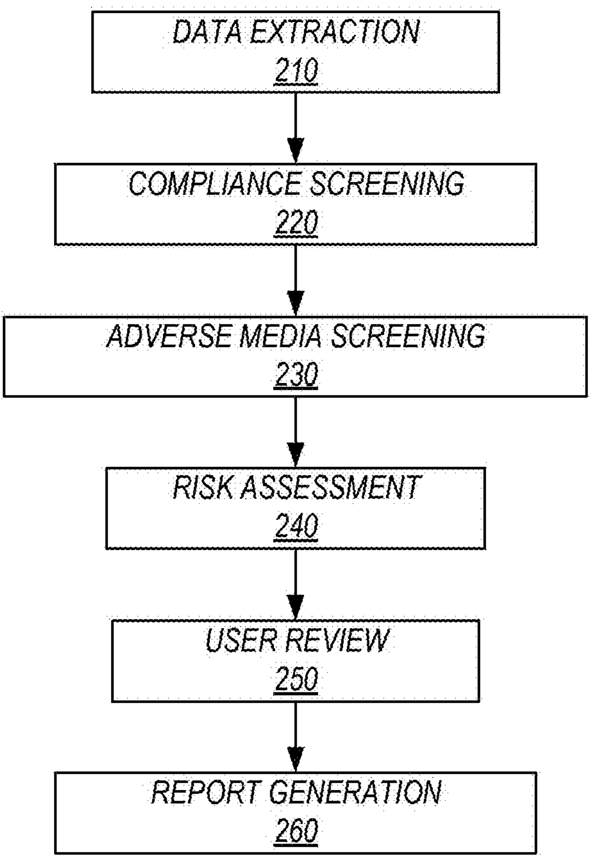
FIG. 2 is a flowchart of an example enhanced due diligence process, such as may be performed by the system of FIG. 1.

FIG. 2 is a flowchart of an example enhanced due diligence process, such as may be performed by the system of FIG. 1. In this example, the method includes data extraction, compliance screening, adverse media screening, risk assessment, user review, and report generation. In other implementations, an enhanced due diligence process may include fewer or additional blocks and/or the blocks may be performed in an order different than illustrated.

Beginning at block 210, a data extraction process may be performed by the data extraction module 104. This process may involve collecting and analyzing information from various sources, both structured and unstructured. For example, the data extraction module may be provided with documents such as Know Your Customer (KYC) forms or other relevant documents that contain information about a counterparty of interest. Utilizing an LLM and/or NLP, the data can be converted into a structured format suitable for analysis. This conversion process may involve tasks such as optical character recognition (OCR), data cleaning, and normalization to ensure that the data is in a consistent and usable format.

Next, at block 220, a compliance screening process may be performed by the compliance screening module 110. This may involve comparing the counterparty (and related entities) against lists of entities associated with negative activities such as high-risk entities or those with compliance, legal, financial, or other violations. The compliance screening module can use various sources for these lists, including watchlists, international sanctions lists, and industry-specific blacklists to ensure that the counterparty is not involved in any illegal or unethical activities that could pose a risk to the organization.

At block 230, an adverse media screening process may be performed by the media screening module 112. This may involve searching news articles, business journals, and other public (and/or private) sources for information relevant to the risk assessment. The media screening module can utilize NLP techniques to understand the context of the information being analyzed, as well as sentiment analysis to determine the tone and sentiment of the sources being reviewed.

Continuing to block 240, a risk assessment evaluation may be performed by the risk assessment module 114. This may involve taking into account the results from the entity resolution, compliance screening, media screening, and/or other modules, as well as organization rules regarding acceptable levels of risk, and generating risk scores associated with each of multiple risk categories and/or an overall risk score. The risk assessment module may employ various methods to weigh different factors and calculate an overall risk score, such as using statistical analysis or machine learning algorithms.

Figure 7:
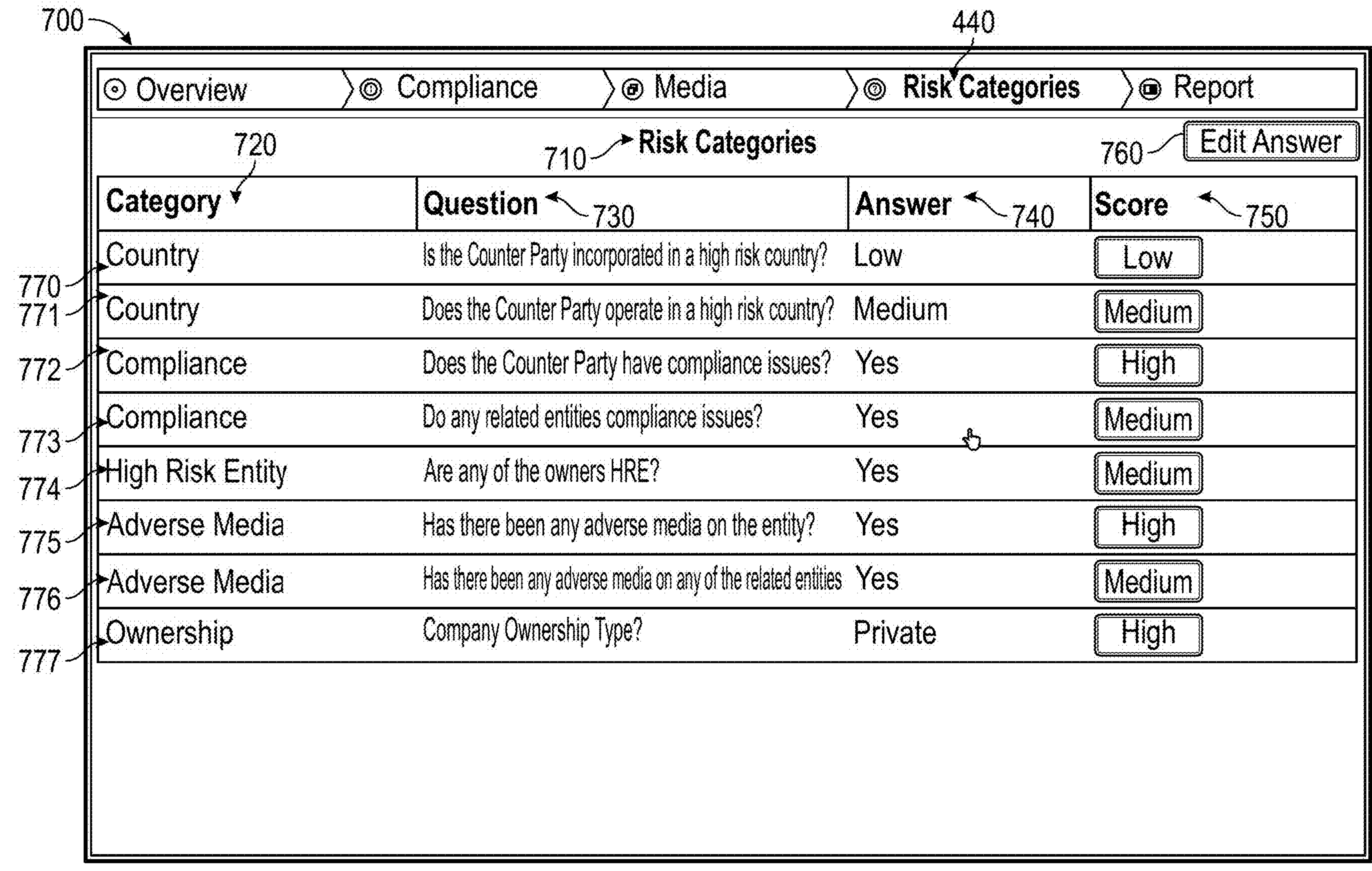
FIG. 7 is an example user interface illustrating some examples of these risk categories and related questions that may be considered.

In some embodiments, a risk assessment process may involve determining risk indicators for various specific risk categories. FIG. 7 is an example user interface illustrating some examples of these risk categories and related questions that may be considered. In the example of FIG. 7, the risk categories include:

Country Risk—Evaluating whether the counterparty entity is incorporated in or operates in a high-risk country, as this can impact the stability and security of a transaction. For example, questions that could be asked under this category might include: (1) Is the counterparty incorporated in a high-risk country? or (2) Is the counterparty operating in a high-risk country?

Compliance Risk—Assessing whether the counterparty (or related entities) has any compliance issues or violations related to laws and regulations, such as financial crimes, bribery and corruption, sanctions, money laundering, and other negatively biased activities. Compliance risk questions could include: (1) Does the counterparty have compliance issues? or (2) Do any related entities have compliance issues (e.g., through affiliated companies or subsidiaries)?

High Risk Entities—Determining whether any of the owners or key individuals associated with the counterparty are considered high-risk entities (HRE) due to their past activities or associations, such as involvement in government organizations, corporate positions, criminal organizations, or the like. This may be important because these entities can pose a significant reputational and legal risk to the organization and/or to themselves. For example, a question that could be asked under this category might include: are any of the owners high risk entities ("HRE")?

Adverse Media—Assessing whether there has been any adverse media coverage related to the counterparty or related entities, such as news articles or other public or private sources that indicate information that could have a negative impact on the proposed transaction may be important to reduce risk of exposure to reputational, operational, market, financial, legal, and/or other risks. For example, questions that could be asked under this category might include: (1) Has there been any adverse media on the counterparty (or related entities)? or (2) Has there been any adverse media on any of the UBOs (Ultimate Beneficial Owners), such as owners of at least a predetermined percentage of the counterparty (or related entity)?

Ownership—Determining the ownership type and structure of the entity (e.g., the counterparty and related entities), can impact a level of transparency, accountability, and potential risks. For example, a question that could be asked under this category might include: What is the ownership type (e.g., private, publicly traded)?

By evaluating these specific risk categories and related questions, an enhanced due diligence system can provide a more comprehensive and nuanced understanding of the risks associated with a particular counterparty, helping organizations make informed decisions about whether to pursue or avoid business transactions with them. In some implementations, the categories and questions may be automatically updated by the system 120 and/or by the user 150.

At block 250, user review of the risk assessments, such as those in the example of FIG. 7, may be performed, such as by the user interface module 106. This may involve allowing the user to review the risk scores and other gathered information, and providing them with tools to customize their reports based on specific criteria or preferences.

At block 260, a report compiling the risk scores and other gathered information is generated. The report may be generated in various formats, such as a PDF, Word document, or interactive online document, for example, and can be customized to meet the specific needs of the user. The report generation module may also allow the user to export the report to various formats, such as a PDF or Word document, or send it directly to another person or department within the organization for further review and/or action.

By using these processes, an enhanced due diligence system can provide significant benefits to organizations that are looking to conduct thorough due diligence on potential counterparties for transactions. The use of LLMs and other AI technologies allows for a more efficient and accurate analysis of data, helping to protect against fraud, corruption, and other risks that can impact the success of a business.

Example User Interfaces

Figure 3:
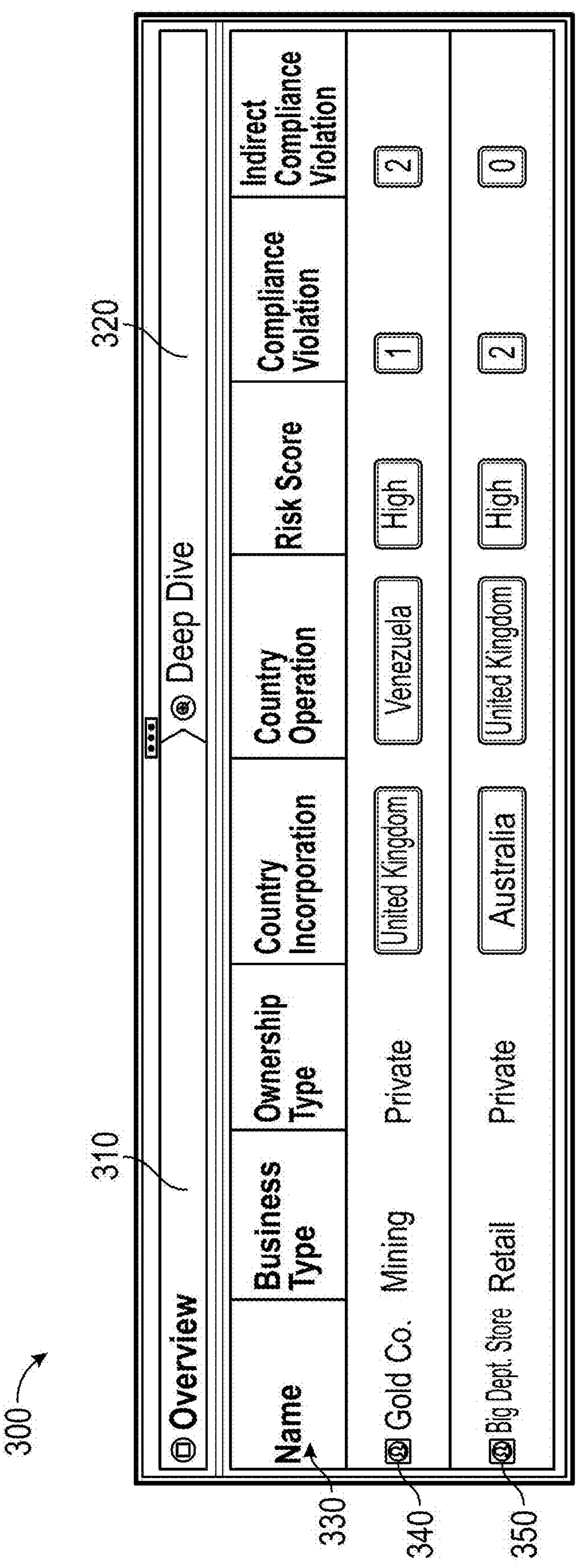

FIG. 3 is an example user interface 300 showing an overview of counterparties that the due diligence process described above has been performed on. The interactive user interfaces of FIGS. 3-7 may be generated by the user interface module 106 and presented to the user 150. In this example, the user interface 300 is currently displaying an overview view, as shown by selection of the overview component 310, and the user may select a deep dive view by selecting the deep dive component 320 or by clicking on a particular counterparty. The categories 330 include Name, Business Type, Ownership Type, Country Incorporation, Country Operation, Risk Score, Compliance Violation, and Indirect Compliance Violation for each of the listed counterparties in rows 340 and 350. In this example, row 340 includes information about the counterparty Gold Co. and row 350 includes information about the counterparty Big Dept. Store. In other embodiments, the overview may include additional or fewer categories of information, such as may be customized by a user.

Figure 4:
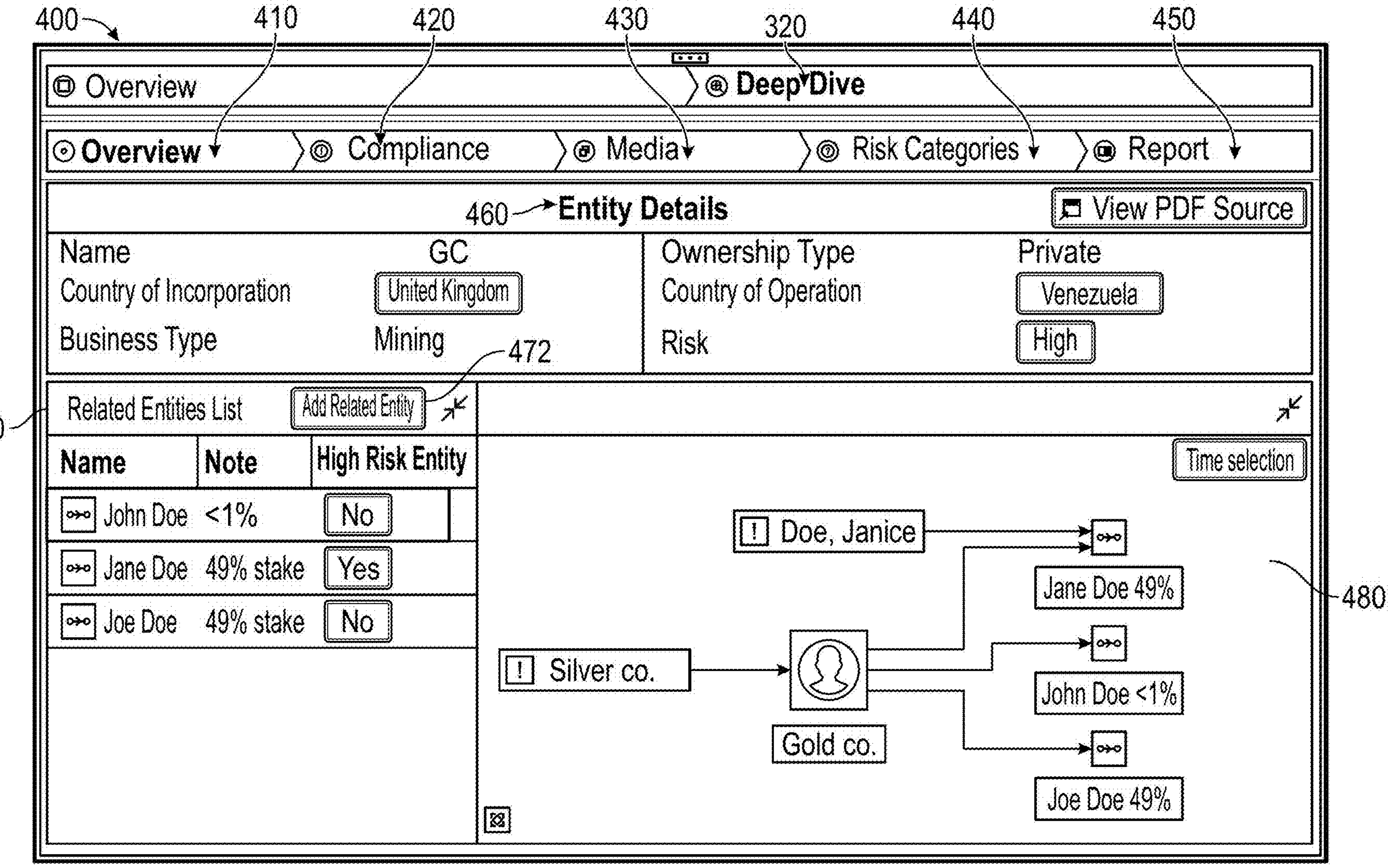
FIG. 4 is an example user interface showing an overview of a specific counterparty, Gold Co.

FIG. 4 is an example user interface 400 showing an overview of a specific counterparty, Gold Co. in this example. In this example, with the deep dive component 320 selected, the user interface 400 provides multiple views of information related to the particular counterparty, such as by the user selecting an overview component 410, a compliance component 420, a media component 430, a risk categories component 440, or a report component 450.

The Overview component 410, which is selected in the user interface 400, provides information about the counterparty in an entity details component 460, related entities component 470, and relationship graph 480.

The Entity Details component 460 provides specific information about the counterparty, such as Country of Incorporation, Business type, Ownership Type, Country of Operation, and Risk. For example, Gold Co. is identified with Private ownership, operating in Venezuela, and assessed with a High risk level.

The Related Entities component 470 includes related entities including John, Jane, and Joe Doe. The relationship graph 480 illustrates relationships between entities (the counterparty and related entities) and stakes in the counterparty. In this example, Jane Doe is shown as owning 49% of Gold Co., while John Doe is shown as owning <1% of Gold Co. The relationship graph also shows a possibly related entity to Jane Doe under the name "Doe, Janice." Additional relationship may be added to the related entities component 470 and relationship graph 480 via the add related entity component 472. The relationship graph 480 also shows a related entity "Silver Co." Details on the relationship, such as those identified by the modules of FIG. 1 that led to identification of the relationship, may be displayed by selecting the Silver Co. object and/or the link between Silver Co. and Cold Co. In some implementations, further related entities may be identified in response to the user request, such as may be provided by clicking on an object (e.g., Silver Co.) and selecting a menu option request additional relationships are added to the graph.

Figure 5:
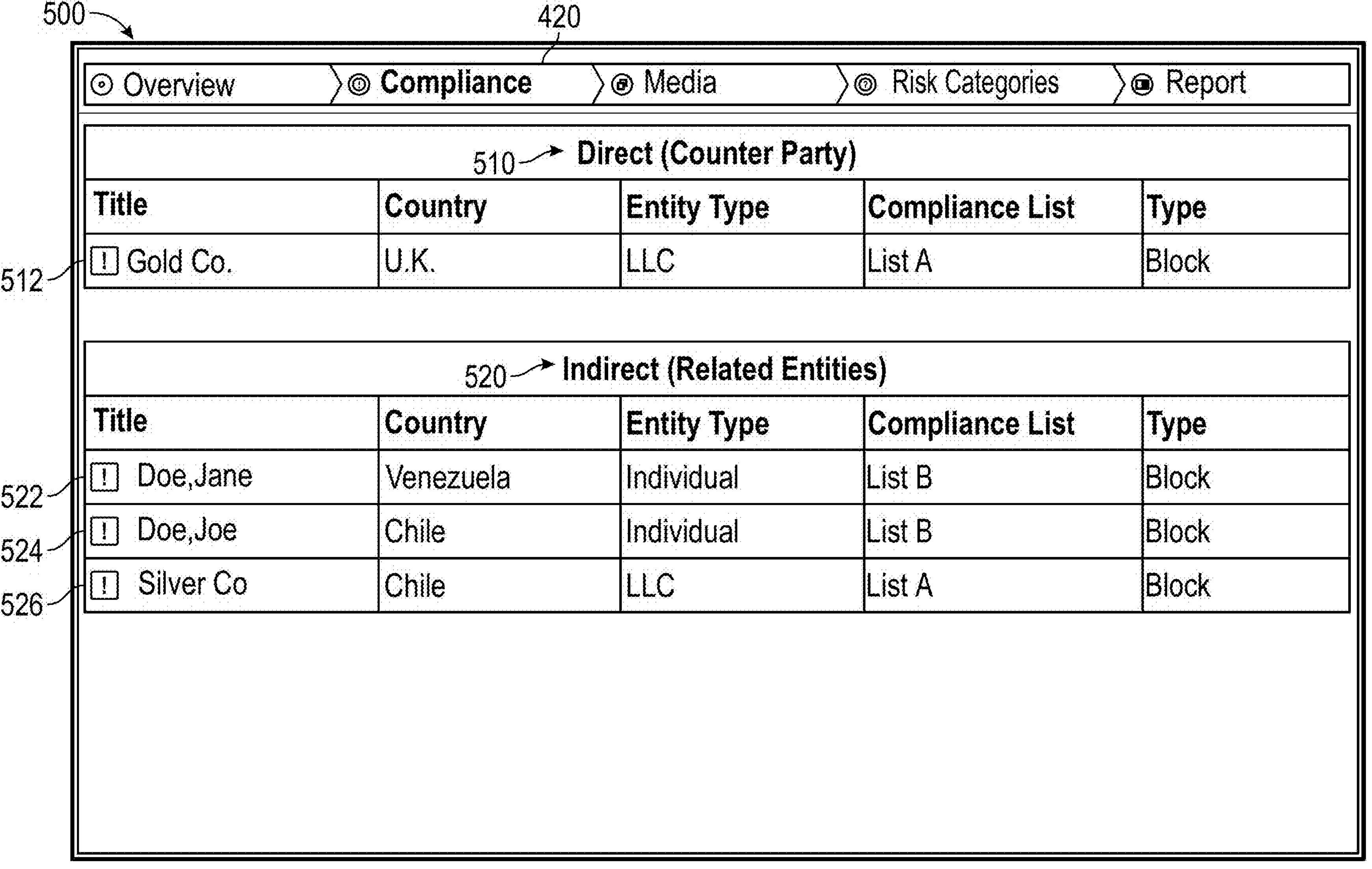
FIG. 5 is an example user interface with the compliance component selected.

FIG. 5 is an example user interface 500 with the compliance component 420 selected. Thus, the user interface 500 includes detailed information regarding compliance issues with reference to the counterparty and related entities. In this example, the user interface includes a direct section 510 that includes information regarding the counterparty and an indirect section 520 that includes information about related entities.

Figure 6:
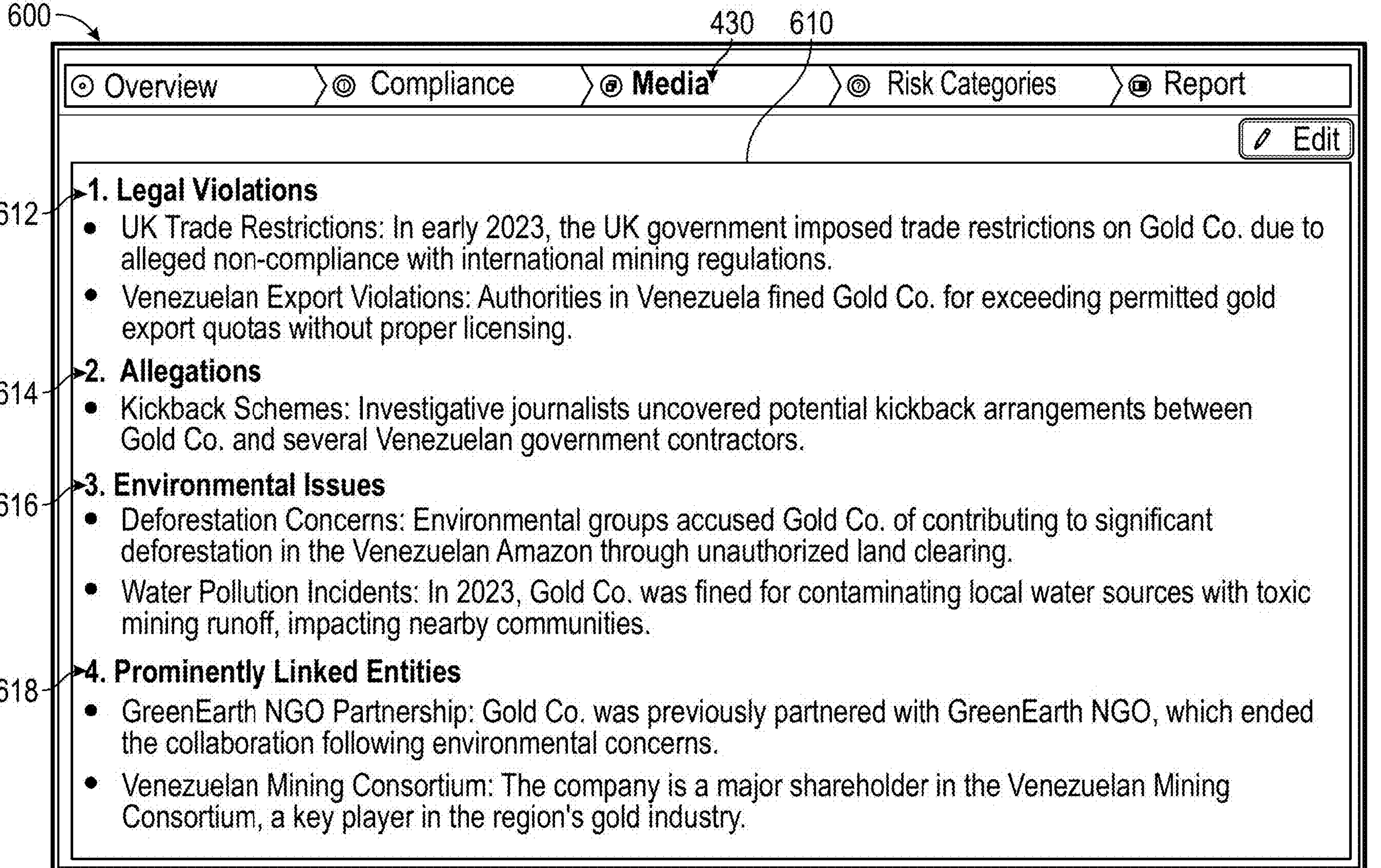
FIG. 6 is an example user interface showing the media component selected.

FIG. 6 is an example user interface 600 showing the media component 430 selected. IN this example, a report of the media scanning, such as may be performed by the media screening module 112 (FIG. 1) is presented. In this example, the media report is titled "Gold Co. Media Report" to indicate the counterparty that is the subject of the report. This example report 610 includes a legal violations section 612, an allegations section 614, an environmental issues section 616, and an prominently linked entities section 618. Each of these sections includes a summary of relevant information compiled and summarized, e.g., by an LLM, of the media screening module 112, such as is discussed in further detail above with reference to FIG. 2.

FIG. 7 is an example user interface 700 showing the risk categories component 440 selected. In this example, the risk categories report 710 includes a list of multiple risk items 770-777, and provides information including category 720, questions 730, answer 740, and score 750 for each risk item. As discussed above with reference to the risk assessment module 114, the risk items may be customized by a user, such as to add (or remove) particular risk items.

In the example of FIG. 7, an edit answer button 760 may be selected to allow the user to edit one or more of the answers 740 in the user interface. For example, if the user does not agree with the "Low" answer for risk item 770, the edit answer button 760 may be selected to allow the user to provide another answer, such as "Medium." In some embodiments, user changes to answers (and/or other user feedback provided to the information provided by the enhanced diligence system 102) can be used in updated training data for models used by the risk assessment module 114.

Figure 8:
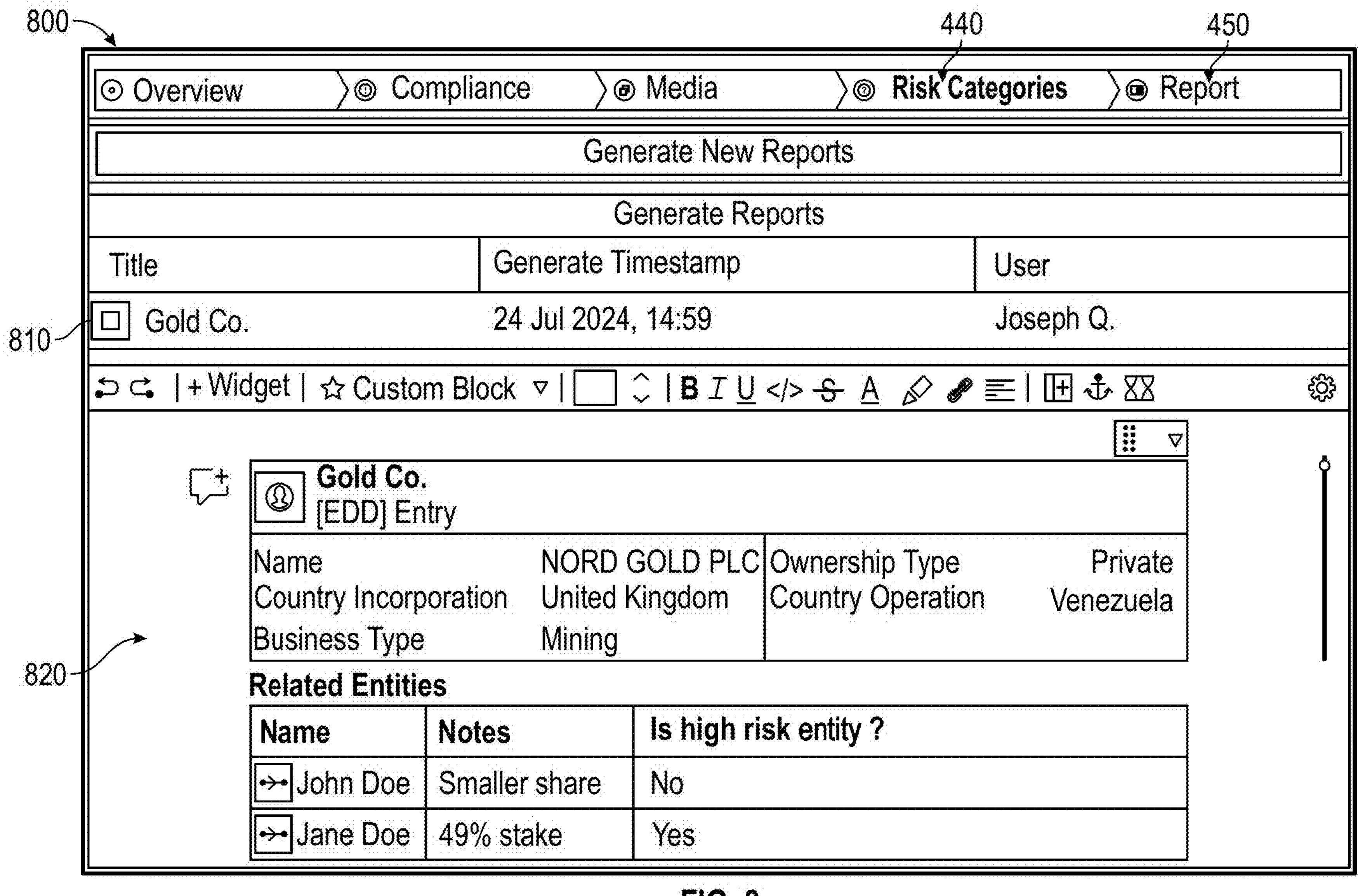
FIG. 8 is an example user interface showing the report component selected.

FIG. 8 is an example user interface 800 showing the report component 450 selected. In this example, the provided report 820 includes a summary of information provided by one or more of the other components 410, 420, 430, and 450. In some implementations, the information provided in the report 820 can be customized by the user, such as to include additional or different information, or to present the information in a different format. The report 820 may then be saved or shared in any available formats.

Example Implementation Triggers

The enhanced due diligence system 120 may perform comprehensive risk assessments periodically across all entities (e.g., potential counterparties) in a database or on-demand for individual counterparties. This functionality ensures that organizations maintain up-to-date risk profiles and can respond swiftly to emerging threats or changes in an entity's status.

In some embodiments, the system 120 may automatically initiate due diligence processes at predefined intervals, such as daily, weekly, or monthly, depending on the organization's requirements. This regular assessment allows for continuous monitoring of entities, ensuring that any changes in risk factors are promptly identified and addressed. As discussed above, the system 120 may leverage various data ingestion, entity resolution, compliance screening, media screening, and risk assessment processes, in communication with various LLM, NLP, and/or other AI modules, to gather and analyze the latest data, providing a refreshed risk profile for each entity.

In some embodiments, an on-demand assessment can be triggered by a user as needed, such as when an entity is identified as a potential counterparty in a transaction.

Example Auditability

The enhanced due diligence system 120 may provide an audit trail of all results generated during each due diligence process, allowing for easy review and verification of the outcomes at a later date. For example, data ingestion, entity resolution, screening, media screening, and risk assessment results may be stored in a secure database, along with relevant metadata such as timestamps and version history. This enables organizations to maintain complete records of their due diligence efforts for compliance purposes or for future audits.

In the event of a dispute or investigation, the system allows users to quickly retrieve the results of previous due diligence processes and provide proof of their due diligence efforts. Additionally, the audit trail can help organizations identify trends in their due diligence findings over time, allowing them to adjust their strategies as necessary to improve their risk management practices.

Example Model Training and Updating

The enhanced due diligence system may be configured to use machine learning techniques to continuously improve accuracy in identifying high-risk entities and assessing risks across multiple categories. In some embodiments, models are trained by obtaining snapshots of entities just before they are associated with a compliance violation or any other event of interest. This enables the system to learn from real-world examples of entities that have exhibited risky behaviors and adjust its algorithms accordingly.

In addition to using snapshots of entities prior to events of interest, the system 120 may also utilize additional data sources such as financial records, news articles, government reports, etc., to train its models. By continuously updating the models based on new data and learning from real-world examples, the system can provide organizations with more accurate and up-to-date risk assessments.

Additional Example Implementations and Aspects

In an implementation the system (e.g., one or more aspects of the system 120 other devices of FIG. 1, and/or the like) may include, or be implemented in, a "virtual computing environment". As used herein, the term "virtual computing environment" should be construed broadly to include, for example, computer-readable program instructions executed by one or more processors (e.g., as described in the example of FIG. 9) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may include a modification of the operation of the virtual computing environment in response to inputs and according to various rules. Other functionality implemented by the virtual computing environment (as described throughout this disclosure) may further include modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may include one or more virtual machines, containers, and/or other types of emulations of computing systems or environments. In some implementations the virtual computing environment may include a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can include a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus.

The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a GUI, among other things.

Figure 9:
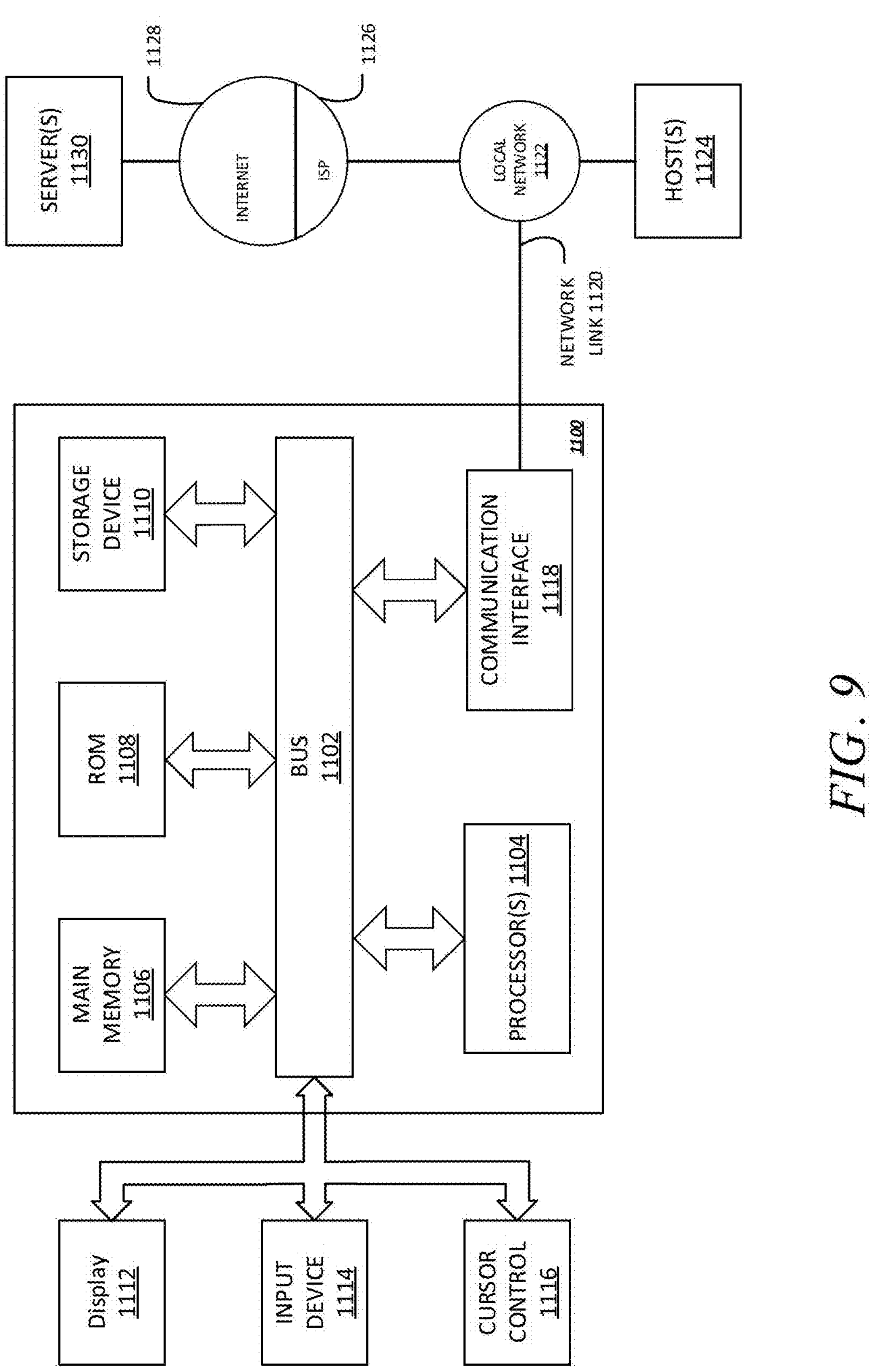
FIG. 9 is a block diagram of an example computing system.

For example, FIG. 9 shows a block diagram that illustrates a computer system 900 upon which various implementations and/or aspects (e.g., one or more aspects of the computing environment of FIG. 1, such as one or more aspects of the system 120, one or more aspects of the user 150, one or more aspects of the external data sources(s) 136, and/or the like) may be implemented. Multiple such computer systems 900 may be used in various implementations of the present disclosure.

Example computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random-access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. The main memory 906 may, for example, include instructions to implement server instances, queuing modules, memory queues, storage queues, user interfaces, and/or other aspects of functionality of the present disclosure, according to various implementations.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), and/or the like, is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one implementation, the techniques herein are performed by computer system 900 in response to processor(s) 904 executing one or more sequences of one or more computer-readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

What is claimed is:

1. A computing system comprising:
- a hardware computer processor; and
- a non-transitory computer readable medium having software instructions stored thereon, the software instructions executable by the hardware computer processor to cause the computing system to execute:
- a user interface module configured to determine, based at least on input from a user, a counterparty entity;
- a data ingestion module configured to:
  - ingest unstructured data, including information provided by the user or documents about the counterparty entity;
  - convert the unstructured data into structured data; and
  - determine related entities to the counterparty entity;
  - wherein entities within the unstructured data are resolved via communications with a large language model (LLM) to account for different spellings and nicknames;
- a compliance screening module configured to:
  - identify one or more lists of entities of interest; and
  - identify, using one or more of matching rules or an LLM, potential instances of the counterparty entity on the one or more lists;
- a media screening module configured to:
  - utilize an LLM agent to generate multiple media screening tasks including separate media screening tasks for each of the counterparty entities and the related entities;
  - communicate with the LLM regarding the multiple media screening tasks, wherein the LLM is Internet-enabled to allow searching of online media sources;
  - receive results of search and analysis performed by the LLM regarding the multiple media screening tasks;
  - communicate with a natural language processor (NLP) to obtain sentiment analysis of results from the LLM; and
  - generate a media screening overview based on results from the LLM and NLP regarding the multiple media screening tasks; and
- a risk assessment module configured to:
  - for each of a plurality of risk categories, generate a risk indicator based on outputs from one or more of the data ingestion module, the compliance screening module, the media screening module, or organization rules indicating risk tolerances;
- wherein the user interface module is further configured to provide a user interface that allows the user to selectively display at least some of the outputs from one or more of the data ingestion module, the compliance screening module, the media screening module, or the risk assessment module.

2. The computing system of claim 1, wherein the user interface module is further configured to:
- receive feedback from the user regarding accuracy of information in the report; and
- initiate updates to one or more models of the risk assessment module based on the user feedback.

3. The computing system of claim 1, wherein the multiple media screening tasks include separate tasks for each media type.

4. The computing system of claim 1, wherein the multiple media screening tasks include separate tasks for different data ranges or languages.

5. The computing system of claim 1, wherein the operations further comprise:
- performing the enhanced due diligence process periodically across all entities in a database of the organization or on-demand for an individual entity.

6. The computing system of claim 1, wherein the operations further comprise:
- storing the outputs from each module for future reference.

7. The computing system of claim 1, wherein the operations further comprise:
- training one or more models used in the enhanced due diligence process based on training data including snapshots of entities just before they are included on the one or more lists.

8. The computing system of claim 1, wherein the counterparty entity is a business entity.

9. The computing system of claim 1, wherein the related entities to the counterparty entity include one or more business entity.

10. A computing system comprising:
- a hardware computer processor; and
- a non-transitory computer readable medium having software instructions stored thereon, the software instructions executable by the hardware computer processor to cause the computing system to execute:
- a user interface module determining a counterparty entity based on user input;

a data ingestion module configured to:

ingest unstructured data, including information provided by the user or documents about the counterparty entity;

convert the unstructured data into structured data; and determine related entities to the counterparty entity;

wherein entities within the unstructured data are resolved via communications with a large language model (LLM) to account for different spellings and nicknames;

a compliance screening module configured to:

identify one or more lists of entities of interest; and identify, using one or more of matching rules or an LLM, potential instances of the counterparty entity on the one or more lists;

a media screening module utilizing an LLM agent to search online media sources, generate sentiment analysis, and produce a screening overview, wherein the media screening module generates separate media screening tasks for each of the counterparty entity and the related entities; and a risk assessment module generating risk indicators for various categories based on data from the other modules and organization rules;

wherein the user interface module is further configured to provide a user interface that allows the user to selectively display at least some of the outputs from one or more of the data ingestion module, the compliance screening module, the media screening module, or the risk assessment module.

11. The computing system of claim 10, wherein the data ingestion module utilizes natural language processing techniques to enhance the accuracy of data conversion and entity identification.

12. The computing system of claim 10, wherein the compliance screening module accesses real-time updates from global sanction lists to ensure current compliance status.

13. The computing system of claim 10, wherein the media screening module categorizes media sources by type and relevance to improve the precision of sentiment analysis.

14. The computing system of claim 10, wherein the risk assessment module applies machine learning algorithms to continuously refine risk indicators based on historical data and feedback.

15. The computing system of claim 10, wherein the user interface module allows customization of risk assessment parameters based on user-defined criteria.

16. The computing system of claim 10, wherein the data ingestion module integrates with external databases to enhance the breadth of data sources available for analysis.

17. The computing system of claim 10, wherein the media screening module tracks changes in media sentiment over time and provides trend analysis for the counterparty entity.

18. A computerized method, performed by a computing system having one or more hardware computer processors and one or more non-transitory computer readable storage device storing software instructions executable by the computing system to perform the computerized method comprising:

determining a counterparty entity based on user input;

ingesting unstructured data, including information provided by the user or documents about the counterparty entity;

converting the unstructured data into structured data;

determining related entities to the counterparty entity, wherein entities within the unstructured data are resolved via communications with a large language model (LLM) to account for different spellings and nicknames;

identifying one or more lists of entities of interest;

identifying, using one or more of matching rules or an LLM, potential instances of the counterparty entity on the one or more lists;

utilizing an LLM agent to search online media sources, generate sentiment analysis, and produce a screening overview, wherein separate media screening tasks are generated for each of the counterparty entity and the related entities;

generating risk indicators for various categories based on data from the other modules and organization rules; and providing a user interface that allows the user to selectively display at least some of: the structured data, the related entities, the one or more lists of entities of interest, the potential instances of the counterparty entity on the one or more lists, results of the separate media screening tasks, the sentiment analysis; the screening overview; or the risk indicators for the various categories.

19. The computerized method of claim 18, further comprising:

receiving feedback from the user regarding accuracy of information in the report; and initiating updates to one or more models of the risk assessment module based on the user feedback.

* * * * *